US012666454B2

(12) United States Patent (10) Patent No.: US 12,666,454 B2
Gutman et al. (45) Date of Patent: Jun. 23, 2026

(54) PILOTS FOR INTERFERENCE MEASUREMENT

(71) Applicant: QUALCOMM Incorporated, San Diego, CA (US)

(72) Inventors: Igor Gutman, Hod HaSharon (IL); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1157 days.

(21) Appl. No.: 17/449,549

(22) Filed: Sep. 30, 2021

(65) Prior Publication Data

US 2023/0106796 A1 Apr. 6, 2023

(51) Int. Cl.
*H04W 72/541* (2023.01)
*H04L 5/00* (2006.01)
*H04W 24/08* (2009.01)

(52) U.S. Cl.
CPC ......... *H04W 72/541* (2023.01); *H04L 5/0048* (2013.01); *H04W 24/08* (2013.01)

(58) Field of Classification Search
CPC .................................................. H04W 72/541
See application file for complete search history.

(56) References Cited

U.S. PATENT DOCUMENTS

| | | | | |
|---|---|---|---|---|
| 2014/0056264 A1* | 2/2014 | Higuchi | ................. | H04B 1/707 |
| | | | | 370/329 |
| 2015/0126146 A1* | 5/2015 | Wang | ..................... | H04B 1/126 |
| | | | | 455/296 |
| 2018/0323887 A1* | 11/2018 | Azarian Yazdi | ...... | H04W 24/08 |
| 2021/0409127 A1* | 12/2021 | Kim | .......................... | H04J 11/00 |
| 2022/0014954 A1* | 1/2022 | Ibrahim | ............... | H04L 5/0051 |
| 2022/0174528 A1* | 6/2022 | Sedin | .................... | H04W 24/08 |
| 2023/0189315 A1* | 6/2023 | Haustein | .............. | H04W 24/02 |
| | | | | 370/252 |

* cited by examiner

*Primary Examiner* — Abdeltif Ajid
(74) *Attorney, Agent, or Firm* — QUALCOMM Incorporated

(57) ABSTRACT

Various aspects of the present disclosure generally relate to wireless communication. In some aspects, a user equipment (UE) may receive, for transmission of an uplink communication, an indication of a first allocation of first resources on a first bandwidth and, for transmission of pilots for interference measurement associated with the uplink communication, an indication of a second allocation of second resources on a second bandwidth. The UE may transmit the uplink communication on the first resources on the first bandwidth and the pilots on the second resources on the second bandwidth, the second bandwidth being different from the first bandwidth. Numerous other aspects are described.

15 Claims, 11 Drawing Sheets

700 ——▶

710 ～ Receive, for transmission of an uplink communication, an indication of a first allocation of first resources on a first bandwidth and, for transmission of pilots for interference measurement associated with the uplink communication, an indication of a second allocation of second resources on a second bandwidth 720 ～ Transmit the uplink communication on the first resources on the first bandwidth and the pilots on the second resources on the second bandwidth, the second bandwidth being different from the first bandwidth

500

600

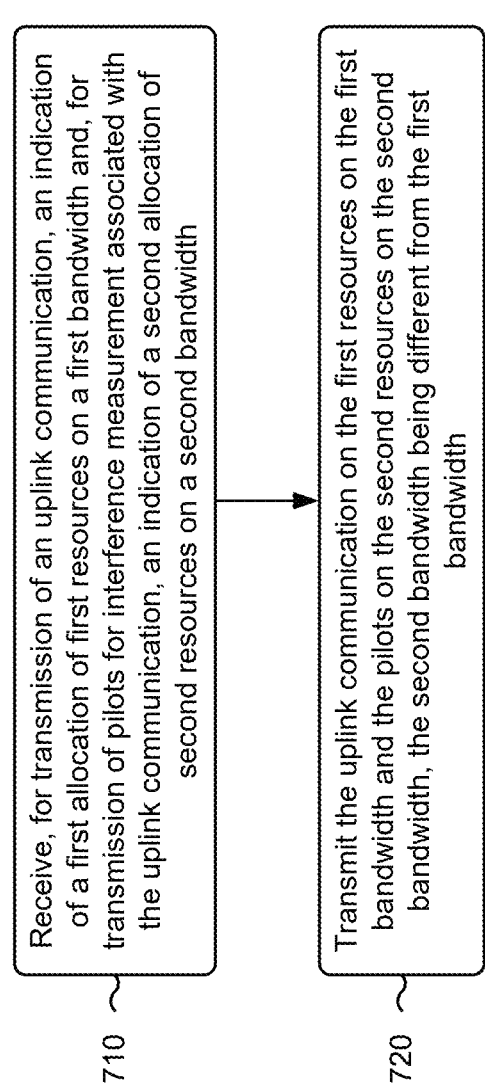

700

710

Receive, for transmission of an uplink communication, an indication of a first allocation of first resources on a first bandwidth and, for transmission of pilots for interference measurement associated with the uplink communication, an indication of a second allocation of second resources on a second bandwidth

720

Transmit the uplink communication on the first resources on the first bandwidth and the pilots on the second resources on the second bandwidth, the second bandwidth being different from the first bandwidth

FIG. 7

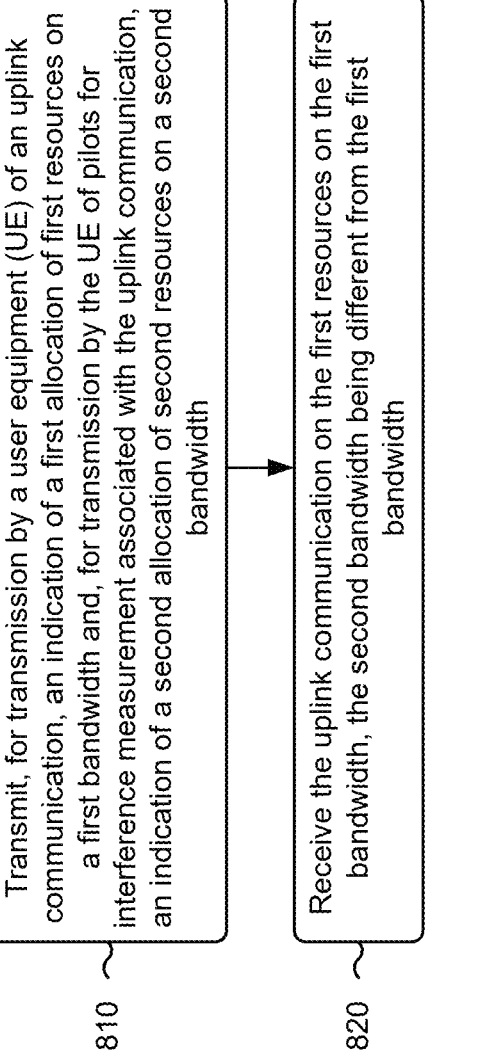

800

810 Transmit, for transmission by a user equipment (UE) of an uplink communication, an indication of a first allocation of first resources on a first bandwidth and, for transmission by the UE of pilots for interference measurement associated with the uplink communication, an indication of a second allocation of second resources on a second bandwidth 820 Receive the uplink communication on the first resources on the first bandwidth, the second bandwidth being different from the first bandwidth

FIG. 8

910 — Transmit, to a base station, an indication of a state in which a cross-link interference satisfies a threshold 920 — Receive, from an additional UE, pilots for interference measurement on resources allocated for reception of a downlink communication from the base station

900

PILOTS FOR INTERFERENCE MEASUREMENT

FIELD OF THE DISCLOSURE

Aspects of the present disclosure generally relate to wireless communication and to techniques and apparatuses for using pilots for interference measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, for transmission of an uplink communication, an indication of a first allocation of first resources on a first bandwidth and, for transmission of pilots for interference measurement associated with the uplink communication, an indication of a second allocation of second resources on a second bandwidth. The method may include transmitting the uplink communication on the first resources on the first bandwidth and the pilots on the second resources on the second bandwidth, the second bandwidth being different from the first bandwidth.

Some aspects described herein relate to a method of wireless communication performed by a base station. The method may include transmitting, for transmission by a UE of an uplink communication, an indication of a first allocation of first resources on a first bandwidth and, for transmission by the UE of pilots for interference measurement associated with the uplink communication, an indication of a second allocation of second resources on a second bandwidth. The method may include receiving the uplink communication on the first resources on the first bandwidth, the second bandwidth being different from the first bandwidth.

Some aspects described herein relate to a method of wireless communication performed by a UE. The method may include transmitting, to a base station, an indication of a state in which a cross-link interference (CLI) satisfies a threshold. The method may include receiving, from an additional UE, pilots for interference measurement on resources allocated for reception of a downlink communication from the base station.

Some aspects described herein relate to a UE for wireless communication. The user equipment may include a memory and one or more processors coupled to the memory. The one or more processors may be configured to receive, for transmission of an uplink communication, an indication of a first allocation of first resources on a first bandwidth and, for transmission of pilots for interference measurement associated with the uplink communication, an indication of a second allocation of second resources on a second bandwidth. The one or more processors may be configured to transmit the uplink communication on the first resources on the first bandwidth and the pilots on the second resources on the second bandwidth, the second bandwidth being different from the first bandwidth.

Some aspects described herein relate to a base station for wireless communication. The base station may include a memory and one or more processors coupled to the memory. The one or more processors may be configured to transmit, for transmission by a UE of an uplink communication, an indication of a first allocation of first resources on a first bandwidth and, for transmission by the UE of pilots for interference measurement associated with the uplink communication, an indication of a second allocation of second resources on a second bandwidth. The one or more processors may be configured to receive the uplink communication on the first resources on the first bandwidth, the second bandwidth being different from the first bandwidth.

Some aspects described herein relate to a UE for wireless communication. The UE may include a memory and one or more processors coupled to the memory. The one or more processors may be configured to transmit, to a base station, an indication of a state in which CLI satisfies a threshold. The one or more processors may be configured to receive, from an additional UE, pilots for interference measurement on resources allocated for reception of a downlink communication from the base station.

Some aspects described herein relate to a non-transitory computer-readable medium that stores a set of instructions for wireless communication by a UE. The set of instructions, when executed by one or more processors of the UE, may cause the UE to receive, for transmission of an uplink communication, an indication of a first allocation of first resources on a first bandwidth and, for transmission of pilots for interference measurement associated with the uplink communication, an indication of a second allocation of second resources on a second bandwidth. The set of instructions, when executed by one or more processors of the UE, may cause the UE to transmit the uplink communication on the first resources on the first bandwidth and the pilots on the second resources on the second bandwidth, the second bandwidth being different from the first bandwidth.

Some aspects described herein relate to a non-transitory computer-readable medium that stores a set of instructions for wireless communication by a base station. The set of instructions, when executed by one or more processors of the base station, may cause the base station to transmit, for transmission by a UE of an uplink communication, an indication of a first allocation of first resources on a first bandwidth and, for transmission by the UE of pilots for interference measurement associated with the uplink communication, an indication of a second allocation of second resources on a second bandwidth. The set of instructions, when executed by one or more processors of the base station, may cause the base station to receive the uplink communication on the first resources on the first bandwidth, the second bandwidth being different from the first bandwidth.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to transmit, to a base station, an indication of a state in which CLI satisfies a threshold. The set of instructions, when executed by one or more processors of the one or more instructions that, when executed by one or more processors of a UE, may cause the one or more instructions that, when executed by one or more processors of a UE to receive, from an additional UE, pilots for interference measurement on resources allocated for reception of a downlink communication from the base station.

Some aspects described herein relate to an apparatus for wireless communication. The apparatus may include means for receiving, for transmission of an uplink communication, an indication of a first allocation of first resources on a first bandwidth and, for transmission of pilots for interference measurement associated with the uplink communication, an indication of a second allocation of second resources on a second bandwidth. The apparatus may include means for transmitting the uplink communication on the first resources on the first bandwidth and the pilots on the second resources on the second bandwidth, the second bandwidth being different from the first bandwidth.

Some aspects described herein relate to an apparatus for wireless communication. The apparatus may include means for transmitting, for transmission by a UE of an uplink communication, an indication of a first allocation of first resources on a first bandwidth and, for transmission by the UE of pilots for interference measurement associated with the uplink communication, an indication of a second allocation of second resources on a second bandwidth. The apparatus may include means for receiving the uplink communication on the first resources on the first bandwidth, the second bandwidth being different from the first bandwidth.

Some aspects described herein relate to an apparatus for wireless communication. The apparatus may include means for transmitting, to a base station, an indication of a state in which CLI satisfies a threshold. The apparatus may include means for receiving, from an additional UE, pilots for interference measurement on resources allocated for reception of a downlink communication from the base station.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-9 are diagrams illustrating example processes associated with using pilots for interference measurement, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
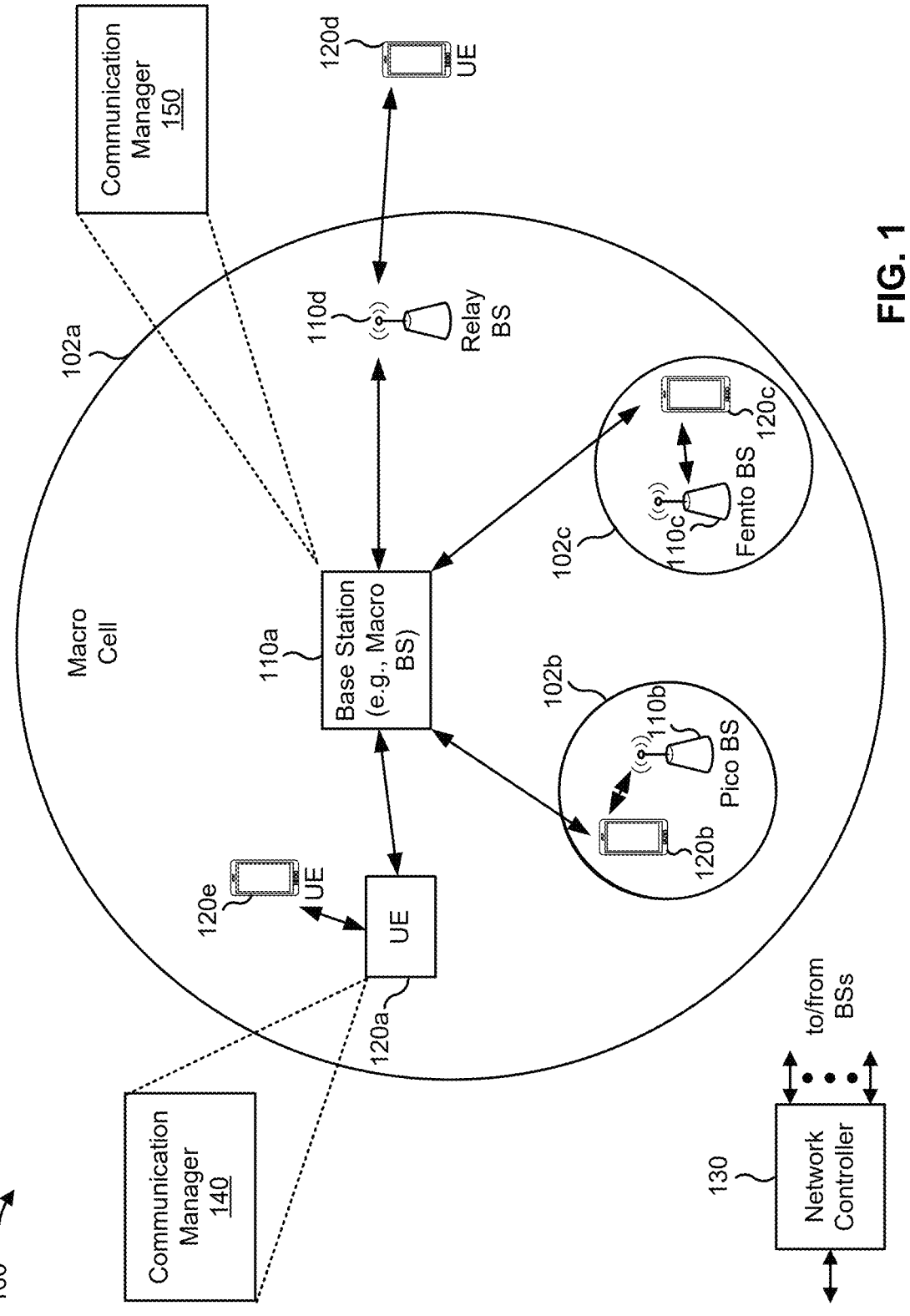
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, for transmission of an uplink communication, an indication of a first allocation of first resources on a first bandwidth and, for transmission of pilots for interference measurement associated with the uplink communication, an indication of a second allocation of second resources on a second bandwidth; and transmit the uplink communication on the first resources on the first bandwidth and the pilots on the second resources on the second bandwidth, the second bandwidth being different from the first bandwidth. Additionally, or alternatively, the communication manager 140 may perform one or more other operations described herein.

In some aspects, the base station 110 may include a communication manager 150. As described in more detail elsewhere herein, the communication manager 150 may transmit, for transmission by a UE of an uplink communication, an indication of a first allocation of first resources on a first bandwidth and, for transmission by the UE of pilots for interference measurement associated with the uplink communication, an indication of a second allocation of second resources on a second bandwidth; and receive the uplink communication on the first resources on the first bandwidth, the second bandwidth being different from the first bandwidth. Additionally, or alternatively, the communication manager 150 may perform one or more other operations described herein.

In some aspects, the UE 120 may include a communication manager 140. As described in more detail elsewhere herein, the communication manager 140 may transmit, to a base station, an indication of a state in which a cross-link interference (CLI) satisfies a threshold; and receive, from an additional UE, pilots for interference measurement on resources allocated for reception of a downlink communication from the base station. Additionally, or alternatively, the communication manager 140 may perform one or more other operations described herein.

As indicated above, FIG. 1 is provided as an example. Other examples may differ from what is described with regard to FIG. 1.

Figure 2:
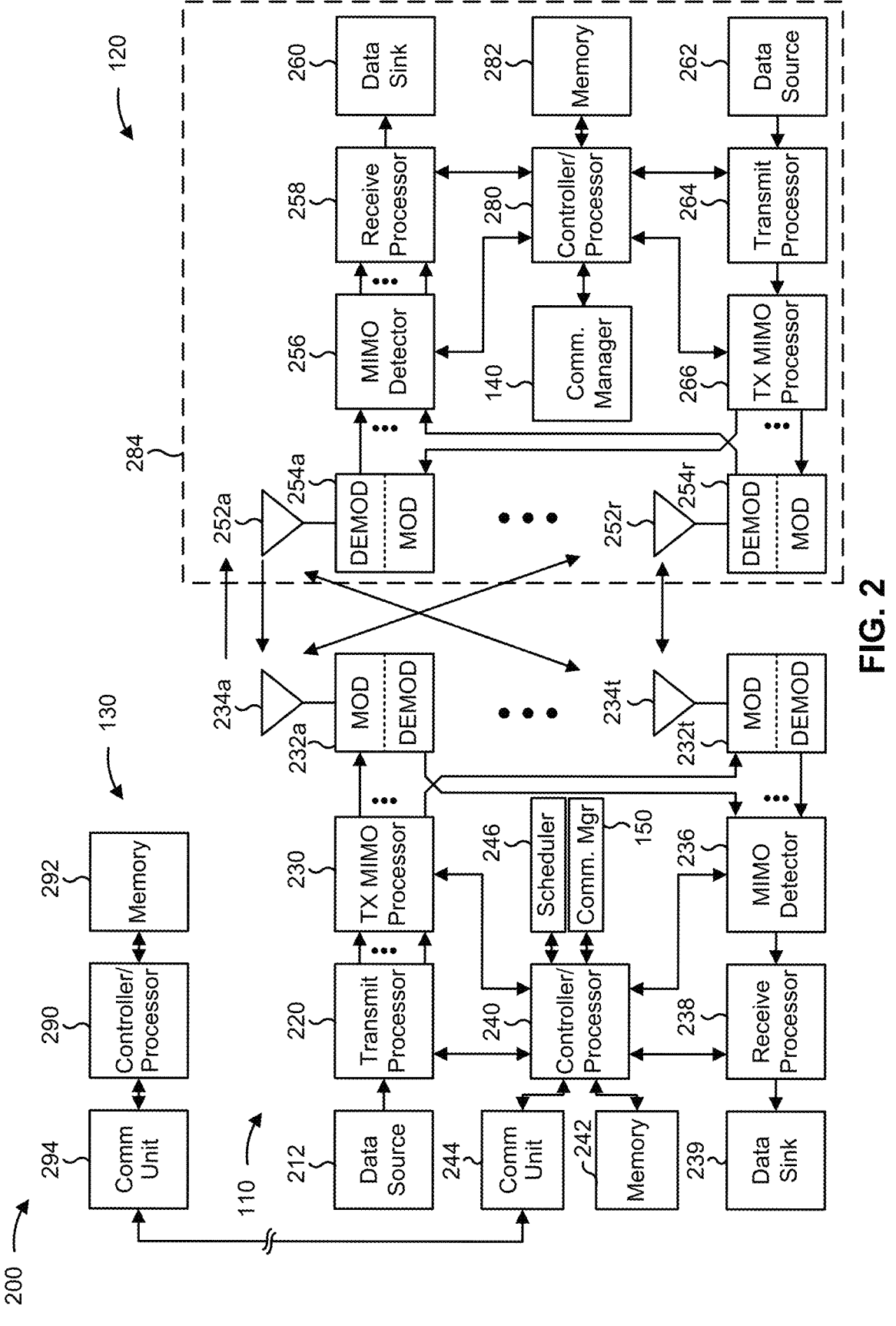
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with using pilots for interference measurement, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/ or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving, for transmission of an uplink communication, an indication of a first allocation of first resources on a first bandwidth and, for transmission of pilots for interference measurement associated with the uplink communication, an indication of a second allocation of second resources on a second bandwidth; and/or means for transmitting the uplink communication on the first resources on the first bandwidth and the pilots on the second resources on the second bandwidth, the second bandwidth being different from the first bandwidth. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, for transmission by a UE of an uplink communication, an indication of a first allocation of first resources on a first bandwidth and, for transmission by the UE of pilots for interference measurement associated with the uplink communication, an indication of a second allocation of second resources on a second bandwidth; and/or means for receiving the uplink communication on the first resources on the first bandwidth, the second bandwidth being different from the first bandwidth. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for transmitting, to a base station, an indication of a state in which CLI satisfies a threshold; and/or means for receiving, from an additional UE, pilots for interference measurement on resources allocated for reception of a downlink communication from the base station. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
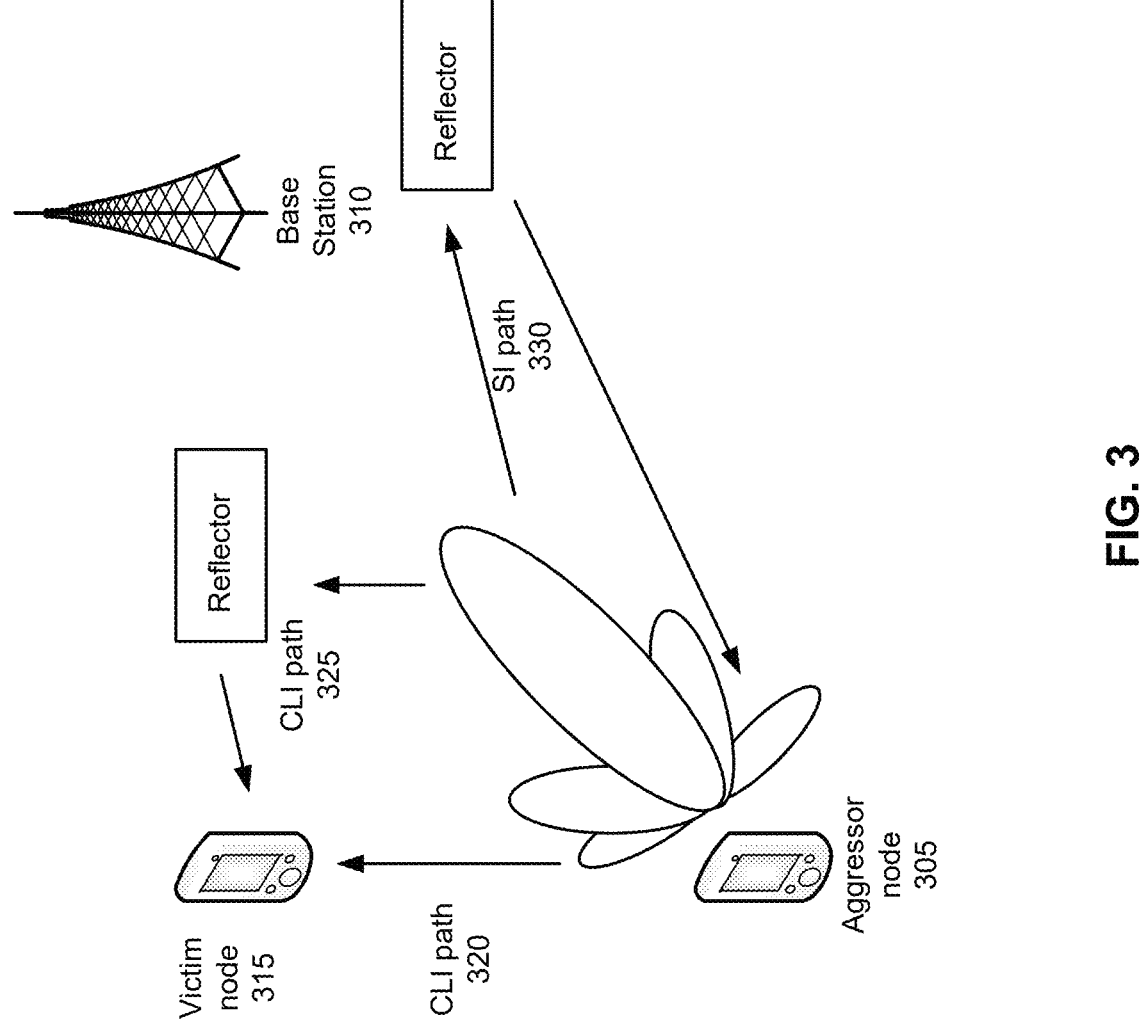
FIG. 3 is a diagram illustrating an example of cross-link interference and self-interference, in accordance with the present disclosure.

FIG. 3 is a diagram illustrating an example 300 of cross-link interference (CLI) and self-interference (SI), in accordance with the present disclosure. As shown in FIG. 3, an aggressor node 305 (e.g., a UE) may communicate with a base station 310 via a beamforming scheme. The base station 310 may also communicate with a victim node 315 (e.g., a UE).

Uplink communications from the aggressor node 305 may follow a CLI path 325 to the victim node 315 that includes a reflection off of a reflector or a CLI path 320 that includes a line of sight path to the victim node 315. The base station 310 may schedule the aggressor node 305 to transmit uplink communications (e.g., via a first beam) simultaneously with downlink communications to the victim node 315 (e.g., via a second beam). In this way, the uplink communications may cause CLI for the downlink communications at the victim node 315.

Uplink communications from the aggressor node 305 may follow an SI path 330 back to the aggressor node 305 that includes a reflection off of a reflector via a line of sight path to an antenna group of the aggressor node 305. The base station 310 may schedule the aggressor node 305 to transmit uplink communications (e.g., via a first beam) simultaneously with downlink communications to the aggressor node 305. In this way, the uplink communications may cause SI for the downlink communications at the aggressor node 305.

As indicated above, FIG. 3 is provided as an example. Other examples may differ from what is described with regard to FIG. 3.

Figure 4:
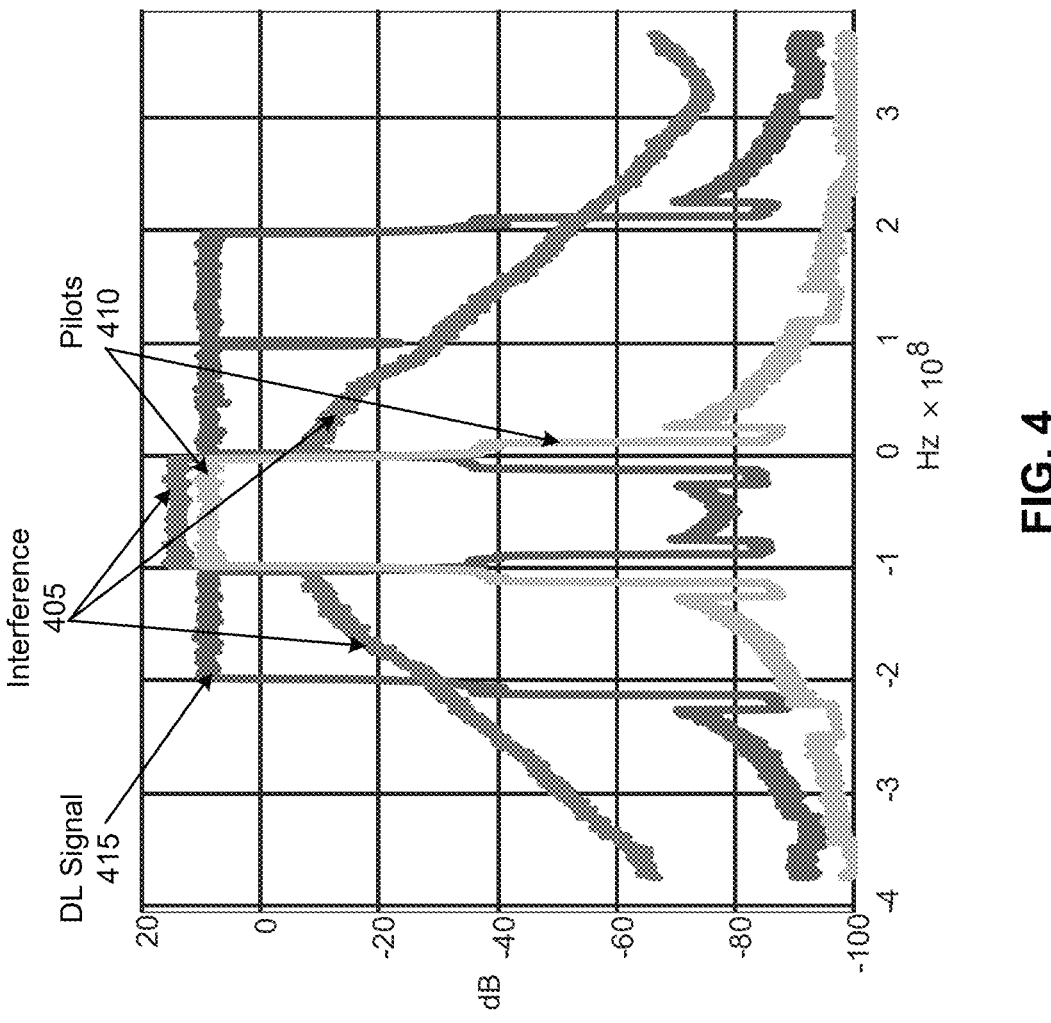
FIG. 4 is a diagram illustrating an example associated with cross-link interference or self-interference, in accordance with the present disclosure.

FIG. 4 is a diagram illustrating an example 400 of CLI and SI, in accordance with the present disclosure. As shown in FIG. 4, an aggressor node may communicate with a base station via a beamforming scheme, such as sub-band full duplexing in which the base station schedules uplink communications on a first bandwidth (e.g., one or more first sub-bands) and downlink communications on a second bandwidth (e.g., one or more second sub-bands). In this way, sub-band full duplex may be used, in which receptions and transmissions are scheduled simultaneously and on different bandwidths. Additionally, or alternatively, the base station may communicate with the aggressor node via the first bandwidth and with a victim node via the second bandwidth. The first bandwidth and the second bandwidth may be adjacent bandwidths and/or may include portions that are spaced in a frequency domain.

As shown in FIG. 4, an uplink signal may cause interference 405 and may include pilots 410. As shown, the interference 405 and the pilots 410 may have a relatively strong power over the first bandwidth (e.g., shown between $-1 \times 10^8$ Hz and 0). However, the interference 405 may also have relatively high strength outside of the first bandwidth and the pilots 410 may have a relatively low strength outside of the first bandwidth. The interference 405 may have relatively high strength outside of the first bandwidth based at least in part on, for example, low noise amplifier and/or power amplifier saturation.

When receiving a downlink (DL) signal 415, the aggressor node and/or a victim node may compensate for interference (e.g., CLI or SI) via beam nulling and/or beam management, analog cancelation (e.g., sampling and canceling an interfering signal), isolation, and/or sub-band full duplexing, among other examples. After compensating for interference, the aggressor node and/or the victim node may use digital interference cancelation (DIC) to cancel remaining interference. DIC may include estimating the interference based at least in part on a linear or non-linear model and canceling the remaining interference digitally.

However, DIC may require pilots on a same bandwidth (e.g., in-band pilots) on which the interference is to be canceled to estimate an over the air linear channel. Based at least in part on the aggressor node and/or the victim node not receiving the pilots 410 (e.g., with sufficient power to decode), the aggressor node and/or the victim node may be unable to cancel the interference 405 on the second bandwidth associated with the downlink signal 415. This may cause communication errors and/or inefficient spectral efficiencies based at least in part on a relatively low signal-to-interference-plus-noise ratio (SINR). In this way, the aggressor node and/or the victim node and the base station may consume computing, network, power, and/or communication resources to detect and/or correct the communication errors and/or to communicate with inefficient spectral efficiencies.

As indicated above, FIG. 4 is provided as an example. Other examples may differ from what is described with regard to FIG. 4.

In some aspects described herein, a base station (e.g., base station 110) communicates with one or more UEs (e.g., UEs 120 and/or an integrated access backhaul including a mobile terminal entity and a distributed unit entity). The base station may communicate with a single UE using a full duplex operation (e.g., a sub-band full duplex operation) in which the base station schedules uplink communications on a first bandwidth (e.g., a first set of sub-bands) and downlink communications on a second bandwidth (e.g., a second set of sub-bands). To assist with SI measurement, the base station may schedule the UE for transmission of pilots outside of the first bandwidth. The UE may use the pilots outside of the first bandwidth to estimate and/or generate a model of interference to be used in a DIC operation to cancel interference from the uplink communications to the downlink communications.

In some aspects, the UE may request an allocation for a dedicated slot and/or symbol for transmission of the pilots, with the allocation extending outside of the first bandwidth. For example, the allocation may have a wider bandwidth than the first bandwidth. In some aspects, the UE may indicate a requested width and/or periodicity, among other examples, for the allocation. In some aspects, the UE may configure a transmission power without a configuration from the base station or may configure the transmission power with a configuration from the base station. The transmission power may be less than a transmission power of the uplink communications to reduce spectrum expansion that may otherwise be caused by non-linearity of a power amplifier and/or low noise amplifier.

In some aspects, a base station (e.g., a control node of a network associated with the uplink communications and the downlink communications) may determine and configure the UE with parameters for transmitting the pilots. For example, the base station may indicate an allocation (e.g., resources), power, and/or other configuration parameters for transmission of the pilots. The resources may be based at least in part on resources (e.g., resource blocks) that are to be used for reception during the full duplex operation and/or based at least in part on a measurement of a wide band signal that includes the first bandwidth and the second bandwidth. In some aspects, the base station may determine the allocation, power and/or other configuration parameters based at least in part on a request from the UE and/or independently from (e.g., in the absence of) a request from the UE.

In some aspects described herein, a UE (e.g., a UE 120, a victim node, and/or an integrated access backhaul including a mobile terminal entity and a distributed unit entity) may indicate to a base station or other network node that the UE detects CLI that satisfies a threshold. The UE may indicate a state (e.g., a configuration) of the UE for which CLI exists. The base station or other network node may record a system configuration associated with the state of the UE and may identify an additional UE (e.g., a UE 120, an aggressor node, and/or an integrated access backhaul including a mobile terminal entity and a distributed unit entity) that is a cause of the CLI. The UE may request pilots when configured with the state of the UE, and the base station or other network node may configure the additional UE with pilots for transmission outside of a bandwidth allocated for transmission of an uplink communication by the additional UE. The UE may receive the pilots from the additional UE, estimate a linear over the air channel, and generate a CLI model for canceling the CLI from the additional UE. In some aspects, the UE may indicate requested characteristics of the pilots, such as a bandwidth, a power, and/or a periodicity of the pilots.

Based at least in part on a UE transmitting pilots outside of an allocation for an uplink communication, the UE or an additional UE (e.g., a receiving UE) may use the pilots to cancel interference caused by the uplink communication outside of the allocation for the uplink communication. In this way, the UE or the additional UE may reduce reception errors and/or support improved spectral efficiency based at least in part on increasing an SINR of downlink communications. This may conserve computing, network, power, and/or communication resources that may have otherwise been used to detect and/or correct communication errors and/or to communicate with inefficient spectral efficiencies.

Figure 5:
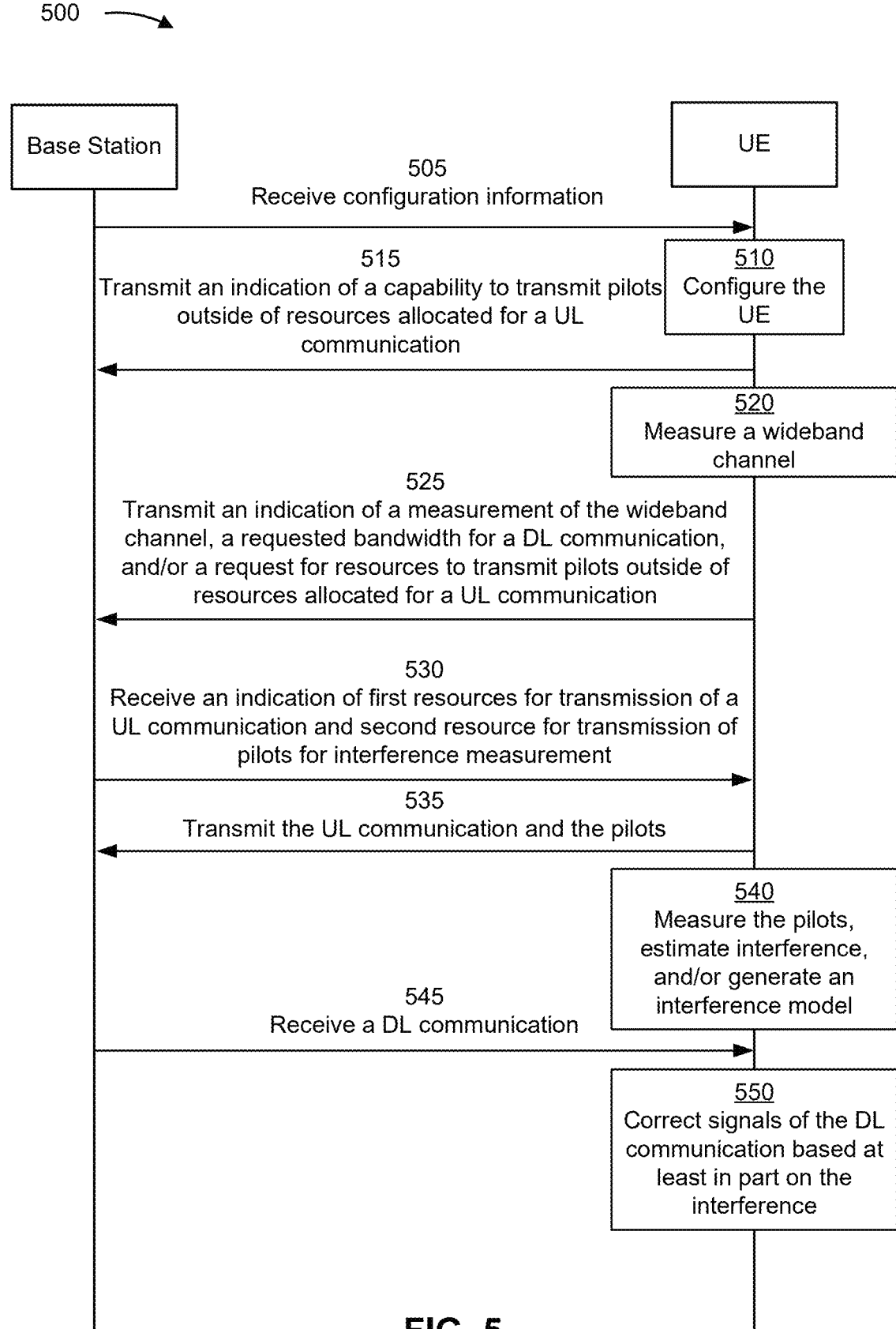
FIGS. 5 and 6 are diagrams illustrating examples associated with using pilots for interference measurement, in accordance with the present disclosure.

FIG. 5 is a diagram illustrating an example 500 associated with using pilots for interference measurement, in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 5. The UE may operate in a full duplex mode (e.g., a sub-band full duplex mode) for communicating with the base station.

As shown by reference number 505, the base station may transmit, and the UE may receive, configuration information. In some aspects, the UE may receive the configuration information via one or more of radio resource control (RRC) signaling, medium access control (MAC) control elements (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit pilots on a first bandwidth that is outside of a second bandwidth allocated for an uplink communication. In some aspects, configuration information may indicate the transmission parameters associated with transmission of the pilots on the first bandwidth. In some aspects, the configuration information may indicate that the UE is to use the pilots for DIC of interference, caused by the uplink communication, for reception of a downlink communication during the full duplex mode.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the base station may receive, an indication of a capability to transmit pilots outside of resources allocated for an uplink communication. In some aspects, the UE may transmit the indication of support as part of an RRC connection procedure. For example, the UE may transmit the indication of support within a capabilities report.

As shown by reference number 520, the UE may measure a wideband channel. For example, the UE may measure a wideband channel using reference signals transmitted by the base station on the wideband channel. In this way, the UE may detect bandwidths of the wideband channel on which the UE expects CLI. Additionally, or alternatively, the UE may transmit and measure on the wideband channel to detect bandwidths of the wideband channel on which the UE expects SI.

As shown by reference number 525, the UE may transmit, and the base station may receive, information associated with configuring a transmission of pilots outside of the resources allocated for the uplink communication, such as an indication of a measurement of the wideband channel, a requested bandwidth for a downlink communication, and/or a request for resources to transmit pilots outside of resources allocated for an uplink communication, among other examples. In some aspects, the UE may transmit the information via dynamic signaling (e.g., using DCI and/or MAC CEs) or via semi-static signaling (e.g., using RRC signaling).

In some aspects, the UE may transmit the indication of the measurement of the wideband signal to indicate that the pilots may be beneficial for SI cancelation and/or for the base station to determine whether the pilots may be beneficial for SI cancelation. In some aspects, the UE may transmit the request for the second allocation of the second resources based at least in part on measurement of the wideband channel.

In some aspects, the UE may indicate (e.g., within the information and/or within the request for the second allocation) a requested width of the second allocation and/or a requested periodicity of the second allocation.

In some aspects, the requested bandwidth for the downlink communication may include an indication of a requested bandwidth to use for the downlink communication based at least in part on the measurement of the wideband channel and/or an indication of a requested bandwidth not to use for the downlink communication based at least in part on the measurement of the wideband channel In some aspects, the information may include an indication of a downlink channel associated with the UE. For example, the information may indicate an SINR that may indicate whether SI and/or CLI should be improved.

As shown by reference number 530, the UE may receive, and the base station may transmit, an indication of first resources for transmission of an uplink communication and second resources for transmission of pilots for interference measurement. For example, the UE may receive an indication of a first allocation of first resources on a first bandwidth for transmitting the uplink communication. The UE may also receive (e.g., in a same communication) an indication of a second allocation of second resources on a second bandwidth for transmission of pilots for interference measurement associated with the uplink communication.

In some aspects, the second bandwidth may be greater than the first bandwidth (e.g., may overlap the first bandwidth and/or extend on a lower end and/or higher end of the first bandwidth). In some aspects, the second bandwidth is adjacent to the first bandwidth (e.g., using a sub-band that is adjacent to the first bandwidth and or that is allocated for a downlink communication). In some aspects, the second bandwidth includes a first portion and a second portion that is spaced from the first portion (e.g., on non-contiguous sub-bands).

In some aspects, the second allocation is based at least in part on an allocation for reception of a downlink communication scheduled for full duplex communication with the uplink communication and/or a measurement of a wideband channel that includes the first allocation and the second allocation, among other examples. For example, the second allocation may allocate a bandwidth that overlaps a bandwidth that is also allocated for reception of the downlink communication so that the pilots can be used to cancel interference of the uplink communication on the bandwidth.

As shown by reference number 535, the UE may transmit the uplink communication and the pilots, and the base station may receive the uplink communication and/or the pilots. For example, the UE may transmit the uplink communication on the first resources on the first bandwidth and the pilots on the second resources on the second bandwidth. The UE may transmit the pilots with a power that is different from (e.g., less than) a power of the uplink communication.

As shown by reference number 540, the UE may measure the pilots on the second bandwidth, estimate the interference, and/or generate an interference model. In this way, the UE may apply the interference model to cancel SI for the downlink communication.

As shown by reference number 545, the UE may receive, and the base station may transmit, the downlink communication. In some aspects, the UE may receive the downlink communication over a bandwidth for which the UE has measured the pilots and/or generated an interference model.

As shown by reference number 550, the UE may correct signals of the DL communication based at least in part on the interference. For example, the UE may perform a DIC operation using measurements of the pilots and estimate of the interference based at least in part on the pilots and/or an interference model.

Based at least in part on a UE transmitting pilots outside of an allocation for an uplink communication, the UE may use the pilots to cancel SI caused by the uplink communication outside of the allocation for the uplink communication. In this way, the UE may reduce reception errors and/or support improved spectral efficiency based at least in part on increasing an SINR of downlink communications. This may conserve computing, network, power, and/or communication resources that may have otherwise been used to detect and/or correct communication errors and/or to communicate with inefficient spectral efficiencies.

As indicated above, FIG. 5 is provided as an example. Other examples may differ from what is described with regard to FIG. 5.

Figure 6:
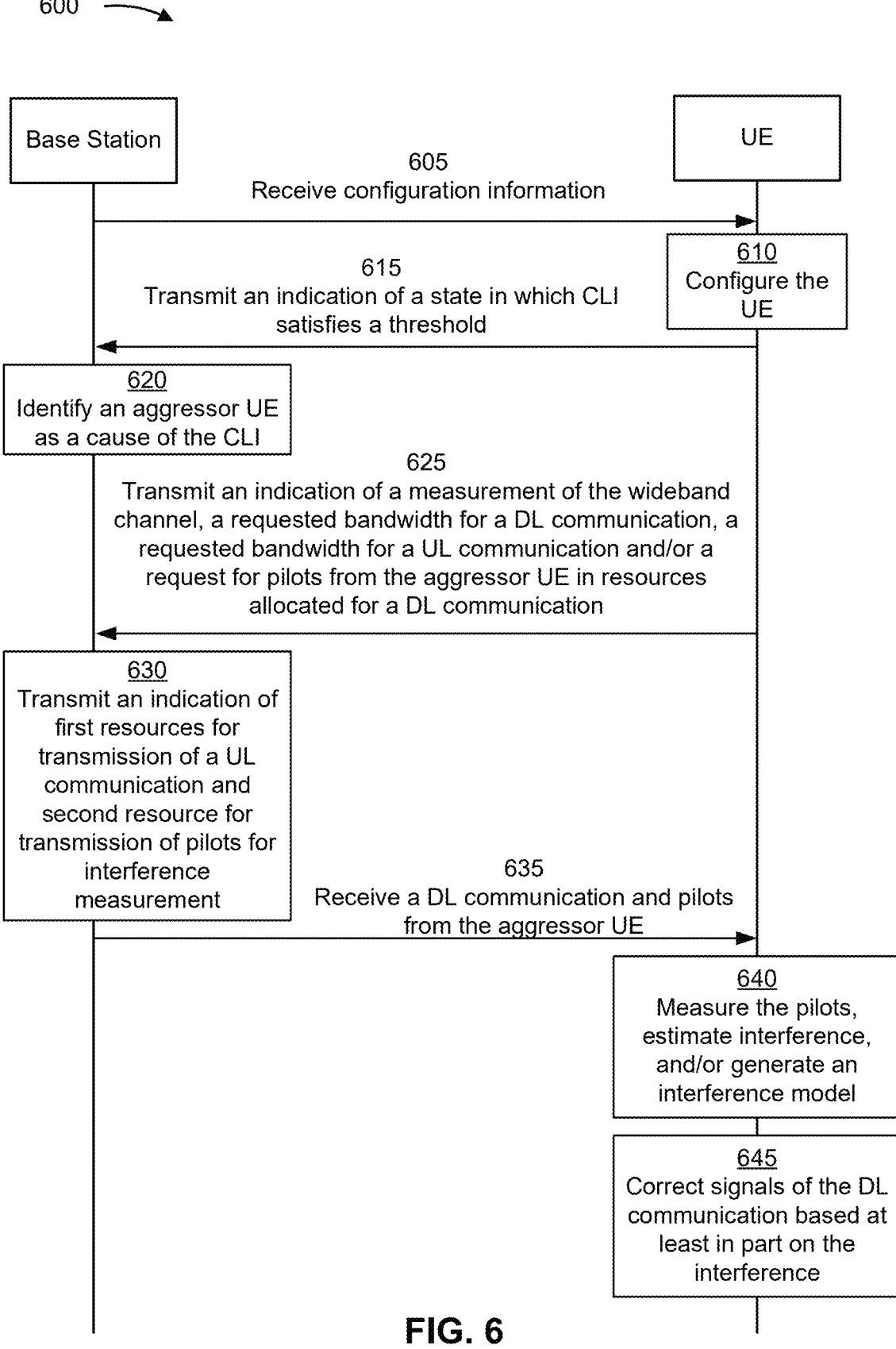

FIG. 6 is a diagram illustrating an example 600 associated with using pilots for interference measurement, in accordance with the present disclosure. As shown in FIG. 6, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 6. The UE may operate in a full duplex mode (e.g., a sub-band full duplex mode) for communicating with the base station.

As shown by reference number 605, the base station may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of a state in which CLI satisfies a threshold. In some aspects, the configuration information may indicate that the UE is to transmit an indication of requested parameters for pilots to be transmitted by an aggressor UE on resources allocated for a downlink communication associated with the UE.

As shown by reference number 610, the UE may configure the UE based at least in part on the configuration information. In some aspects, the UE may be configured to perform one or more operations described herein based at least in part on the configuration information.

As shown by reference number 615, the UE may transmit, and the base station may receive, an indication of a state in which CLI satisfies a threshold. For example, the UE may transmit the indication of any state that has CLI that satisfies a threshold. The UE met detect the CLI based at least in part on an SINR and/or a noise floor measured while operating in the state.

As shown by reference number 620, the base station may identify an aggressor UE as a cause of the CLI when the UE is in the state. For example, the base station may identify the aggressor UE based at least in part on measurements of the interference signaling and/or scheduling of uplink communications by the aggressor UE in nearby bandwidths, among other examples.

As shown by reference number 625, the UE may transmit, and the base station may receive, information associated with configuring a transmission of pilots outside of the resources allocated for the uplink communication, such as an indication of a measurement of the wideband channel, a requested bandwidth for a downlink communication (e.g., for the UE), a requested bandwidth for an uplink communication (e.g., for the aggressor UE), and/or a request for pilots from the aggressor UE in resources allocated for a downlink communication, among other examples. In some aspects, the information may further include an indication of an estimation of a downlink channel associated with the UE. In some aspects, the UE may transmit the information via dynamic signaling (e.g., using DCI and/or MAC CEs) or via semi-static signaling (e.g., using RRC signaling).

In some aspects, the requested bandwidth for the downlink communication includes an indication of a requested bandwidth to use for the downlink communication based at least in part on the measurement of the wideband channel or an indication of a requested bandwidth not to use for the downlink communication based at least in part on the measurement of the wideband channel. In some aspects, the requested bandwidth for the uplink communication includes an indication of a requested bandwidth to use for the uplink communication based at least in part on the measurement of the wideband channel or an indication of a requested bandwidth not to use for the uplink communication based at least in part on the measurement of the wideband channel.

In some aspects, the UE may transmit the indication of the measurement of the wideband signal to indicate that the pilots may be beneficial for CLI cancelation and/or for the base station to determine whether the pilots may be beneficial for CLI cancelation. In some aspects, the UE may transmit the request for the second allocation of the second resources based at least in part on measurement of the wideband channel.

In some aspects, the UE may indicate (e.g., within the information and/or within the request for the second allocation) a requested a requested width of the second allocation and/or a requested periodicity of the second allocation. In some aspects, the UE may indicate a requested transmission power associated with the second allocation.

In some aspects, the requested bandwidth for the downlink communication may include an indication of a requested bandwidth to use for the downlink communication based at least in part on the measurement of the wideband channel and/or an indication of a requested bandwidth not to use for the downlink communication based at least in part on the measurement of the wideband channel As shown by reference number 630, the base station may transmit, an the aggressor UE may receive, an indication of first resources for transmission of an uplink communication and second resources for transmission of pilots for interference measurement. For example, the base station may transmit an indication of a first allocation of first resources on a first bandwidth for transmitting the uplink communication. The base station may also transmit (e.g., in a same communication) an indication of a second allocation of second resources on a second bandwidth for transmission of pilots for interference measurement associated with the uplink communication.

In some aspects, the second bandwidth may be greater than the first bandwidth (e.g., may overlap the first bandwidth and/or extend on a lower end and/or higher end of the first bandwidth). In some aspects, the second bandwidth is adjacent to the first bandwidth (e.g., using a sub-band that is adjacent to the first bandwidth and or that is allocated for a downlink communication). In some aspects, the second bandwidth includes a first portion and a second portion that is spaced from the first portion (e.g., on non-contiguous sub-bands).

In some aspects, the second allocation is based at least in part on an allocation for reception, by the UE, of the downlink communication and/or a measurement of a wideband channel that includes the first allocation and the second allocation, among other examples. For example, the second allocation may allocate a bandwidth that overlaps a bandwidth that is also allocated for reception of the downlink communication so that the pilots can be used to cancel interference of the uplink communication on the bandwidth.

As shown by reference number 635, the UE may receive, and the base station may transmit, a downlink communication and pilots from the aggressor UE. For example, the UE may receive the pilots for interference measurement on resources allocated for reception of the downlink communication from the base station.

As shown by reference number 640, the UE may measure the pilots, estimate the interference, and/or generate an interference model. In this way, the UE may apply the interference model to cancel CLI for the downlink communication.

As shown by reference number 645, the UE may correct signals of the DL communication based at least in part on the interference. For example, the UE may perform a DIC operation using measurements of the pilots and estimate of the interference based at least in part on the pilots and/or an interference model.

Based at least in part on aggressor UE transmitting pilots outside of an allocation for an uplink communication by the aggressor UE, the UE (e.g., a receiving UE) may use the pilots to cancel interference caused by the uplink communication outside of the allocation for the uplink communication. In this way, the UE may reduce reception errors and/or support improved spectral efficiency based at least in part on increasing an SINR of downlink communications. This may conserve computing, network, power, and/or communication resources that may have otherwise been used to detect and/or correct communication errors and/or to communicate with inefficient spectral efficiencies.

As indicated above, FIG. 6 is provided as an example. Other examples may differ from what is described with regard to FIG. 6.

FIG. 7 is a diagram illustrating an example process 700 performed, for example, by a UE, in accordance with the present disclosure. Example process 700 is an example where the UE (e.g., UE 120) performs operations associated with pilots for interference measurement.

As shown in FIG. 7, in some aspects, process 700 may include receiving, for transmission of an uplink communication, an indication of a first allocation of first resources on a first bandwidth and, for transmission of pilots for interference measurement associated with the uplink communication, an indication of a second allocation of second resources on a second bandwidth (block 710). For example, the UE (e.g., using communication manager 140 and/or reception component 1002, depicted in FIG. 10) may receive, for transmission of an uplink communication, an indication of a first allocation of first resources on a first bandwidth and, for transmission of pilots for interference measurement associated with the uplink communication, an indication of a second allocation of second resources on a second bandwidth, as described above.

As further shown in FIG. 7, in some aspects, process 700 may include transmitting the uplink communication on the first resources on the first bandwidth and the pilots on the second resources on the second bandwidth, the second bandwidth being different from the first bandwidth (block 720). For example, the UE (e.g., using communication manager 140 and/or transmission component 1004, depicted in FIG. 10) may transmit the uplink communication on the first resources on the first bandwidth and the pilots on the second resources on the second bandwidth, the second bandwidth being different from the first bandwidth, as described above.

Process 700 may include additional aspects, such as any single aspect or any combination of aspects described below and/or in connection with one or more other processes described elsewhere herein.

In a first aspect, the second bandwidth is greater than the first bandwidth, wherein the second bandwidth is adjacent to the first bandwidth, or wherein the second bandwidth includes a first portion and a second portion that is spaced from the first portion.

In a second aspect, alone or in combination with the first aspect, process 700 includes measuring the pilots on the second bandwidth and receiving a downlink communication on the second bandwidth based at least in part on the pilots.

In a third aspect, alone or in combination with one or more of the first and second aspects, receiving the downlink communication on the second bandwidth based at least in part on the pilots comprises estimating, based at least in part on the pilots, interference associated with transmitting the uplink communication, and correcting signals associated with the downlink communication based at least in part on the interference associated with transmitting the uplink communication.

In a fourth aspect, alone or in combination with one or more of the first through third aspects, process 700 includes transmitting a request for the second allocation of the second resources.

In a fifth aspect, alone or in combination with one or more of the first through fourth aspects, the request for the second allocation of the second resources comprises indications of one or more of a requested width of the second allocation, or a requested periodicity of the second allocation.

In a sixth aspect, alone or in combination with one or more of the first through fifth aspects, the second allocation is based at least in part on an allocation for reception of a downlink communication scheduled for full duplex communication with the uplink communication, or a measurement of a wideband channel that includes the first allocation and the second allocation.

In a seventh aspect, alone or in combination with one or more of the first through sixth aspects, process 700 includes one or more of transmitting an indication of the measurement of the wideband channel, transmitting an indication of a requested bandwidth to use for the downlink communication based at least in part on the measurement of the wideband channel, or transmitting an indication of a requested bandwidth not to use for the downlink communication based at least in part on the measurement of the wideband channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with using pilots for interference measurement.

As shown in FIG. 8, in some aspects, process 800 may include transmitting, for transmission by a UE of an uplink communication, an indication of a first allocation of first resources on a first bandwidth and, for transmission by the UE of pilots for interference measurement associated with the uplink communication, an indication of a second allocation of second resources on a second bandwidth (block 810). For example, the base station (e.g., using communication manager 150 and/or transmission component 1104, depicted in FIG. 11) may transmit, for transmission by a UE of an uplink communication, an indication of a first allocation of first resources on a first bandwidth and, for transmission by the UE of pilots for interference measurement associated with the uplink communication, an indication of a second allocation of second resources on a second bandwidth, as described above.

As further shown in FIG. 8, in some aspects, process 800 may include receiving the uplink communication on the first resources on the first bandwidth, the second bandwidth being different from the first bandwidth (block 820). For example, the base station (e.g., using communication manager 150 and/or reception component 1102, depicted in FIG. 11) may receive the uplink communication on the first resources on the first bandwidth, the second bandwidth being different from the first bandwidth, as described above.

Process 800 may include additional aspects, such as any single aspect or any combination of aspects described below and/or in connection with one or more other processes described elsewhere herein.

In a first aspect, the second bandwidth is greater than the first bandwidth.

In a second aspect, alone or in combination with the first aspect, process 800 includes receiving, from the UE, a request for the second allocation of the second resources, or receiving, from an additional UE, the request for the second allocation of the second resources.

In a third aspect, alone or in combination with one or more of the first and second aspects, the request for the second allocation of resources comprises indications of one or more of a requested width of the second allocation, a requested periodicity of the second allocation, a requested transmission power associated with the second allocation, or an indication of a state in which CLI satisfies a threshold.

In a fourth aspect, alone or in combination with one or more of the first through third aspects, process 800 includes identifying the UE as a cause of the CLI for the additional UE based at least in part on parameters associated with the state.

In a fifth aspect, alone or in combination with one or more of the first through fourth aspects, the second allocation is based at least in part on an allocation for transmission, to the UE or an additional UE, of a downlink communication scheduled during a same time resource as the uplink communication, or a measurement of a wideband channel that includes the first allocation and the second allocation.

In a sixth aspect, alone or in combination with one or more of the first through fifth aspects, process 800 includes one or more of receiving an indication of measurements of one or more portions of the wideband channel, receiving an indication of a requested bandwidth to use for the downlink communication based at least in part on the measurement of the wideband channel, receiving an indication of a requested bandwidth not to use for the downlink communication based at least in part on the measurement of the wideband channel, receiving an indication of a requested bandwidth to use for the uplink communication based at least in part on the measurement of the wideband channel, or receiving an indication of a requested bandwidth not to use for the uplink communication based at least in part on the measurement of the wideband channel.

In a seventh aspect, alone or in combination with one or more of the first through sixth aspects, transmitting the indication of the second allocation is based at least in part on one or more of a first channel estimation for a first downlink channel associated with the UE, or a second channel estimation for a second downlink channel associated with an additional UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
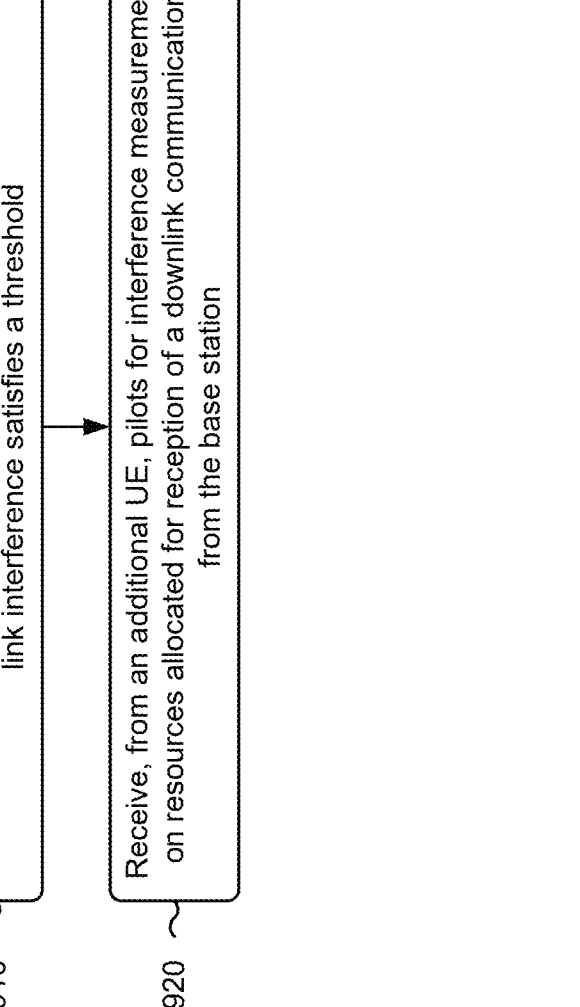

FIG. 9 is a diagram illustrating an example process 900 performed, for example, by a UE, in accordance with the present disclosure. Example process 900 is an example where the UE (e.g., UE 120) performs operations associated with using pilots for interference measurement.

As shown in FIG. 9, in some aspects, process 900 may include transmitting, to a base station, an indication of a state in which CLI satisfies a threshold (block 910). For example, the UE (e.g., using communication manager 140 and/or transmission component 1004, depicted in FIG. 10) may transmit, to a base station, an indication of a state in which CLI satisfies a threshold, as described above.

As further shown in FIG. 9, in some aspects, process 900 may include receiving, from an additional UE, pilots for interference measurement on resources allocated for reception of a downlink communication from the base station (block 920). For example, the UE (e.g., using communication manager 140 and/or reception component 1002, depicted in FIG. 10) may receive, from an additional UE, pilots for interference measurement on resources allocated for reception of a downlink communication from the base station, as described above.

Process 900 may include additional aspects, such as any single aspect or any combination of aspects described below and/or in connection with one or more other processes described elsewhere herein.

In a first aspect, a bandwidth of the pilots is greater than a bandwidth of an uplink communication by the additional UE.

In a second aspect, alone or in combination with the first aspect, process 900 includes measuring the pilots, and receiving the downlink communication based at least in part on the pilots.

In a third aspect, alone or in combination with one or more of the first and second aspects, receiving the downlink communication based at least in part on the pilots comprises estimating, based at least in part on the pilots, interference associated with an uplink communication transmitted by the additional UE, and correcting signals associated with the downlink communication based at least in part on the interference associated with the uplink communication.

In a fourth aspect, alone or in combination with one or more of the first through third aspects, process 900 includes transmitting an indication of a measurement of one or more portions of a wideband channel, transmitting an indication of a requested bandwidth to use for the downlink communication based at least in part on the measurement of the wideband channel, transmitting an indication of a requested bandwidth not to use for the downlink communication based at least in part on the measurement of the wideband channel, transmitting an indication of a requested bandwidth for the additional UE to use for an uplink communication based at least in part on the measurement of the wideband channel, or transmitting an indication of a requested bandwidth for the additional UE not to use for the uplink communication based at least in part on the measurement of the wideband channel.

In a fifth aspect, alone or in combination with one or more of the first through fourth aspects, process 900 includes transmitting indications of one or more of a requested width of an allocation for the pilots, a requested periodicity of the allocation for the pilots, or a requested transmission power associated with the pilots.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
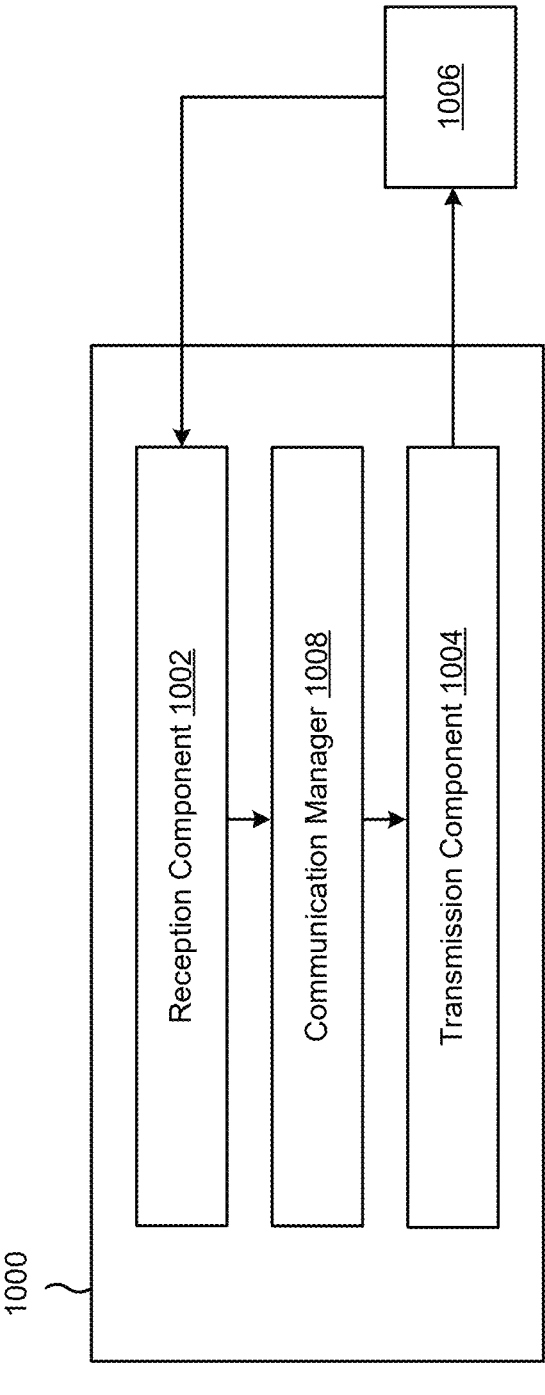
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 4 and 5. Additionally, or alternatively, the apparatus 1000 may be configured to perform one or more processes described herein, such as process 700 of FIG. 7, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, for transmission of an uplink communication, an indication of a first allocation of first resources on a first bandwidth and, for transmission of pilots for interference measurement associated with the uplink communication, an indication of a second allocation of second resources on a second bandwidth. The transmission component 1004 may transmit the uplink communication on the first resources on the first bandwidth and the pilots on the second resources on the second bandwidth, the second bandwidth being different from the first bandwidth.

The communication manager 1008 may measure the pilots on the second bandwidth.

The reception component 1002 may receive a downlink communication on the second bandwidth based at least in part on the pilots.

The transmission component 1004 may transmit a request for the second allocation of the second resources.

The transmission component 1004 may transmit, to a base station, an indication of a state in which CLI satisfies a threshold. The reception component 1002 may receive, from an additional UE, pilots for interference measurement on resources allocated for reception of a downlink communication from the base station.

The communication manager 1008 may measure the pilots.

The reception component 1002 may receive the downlink communication based at least in part on the pilots.

The transmission component 1004 may transmit an indication of a measurement of one or more portions of a wideband channel.

The transmission component 1004 may transmit an indication of a requested bandwidth to use for the downlink communication based at least in part on the measurement of the wideband channel.

The transmission component 1004 may transmit an indication of a requested bandwidth not to use for the downlink communication based at least in part on the measurement of the wideband channel.

The transmission component 1004 may transmit an indication of a requested bandwidth for the additional UE to use for an uplink communication based at least in part on the measurement of the wideband channel.

The transmission component 1004 may transmit an indication of a requested bandwidth for the additional UE not to use for the uplink communication based at least in part on the measurement of the wideband channel.

The transmission component 1004 may transmit indications of one or more of a requested width of an allocation for the pilots, a requested periodicity of the allocation for the pilots, or a requested transmission power associated with the pilots.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
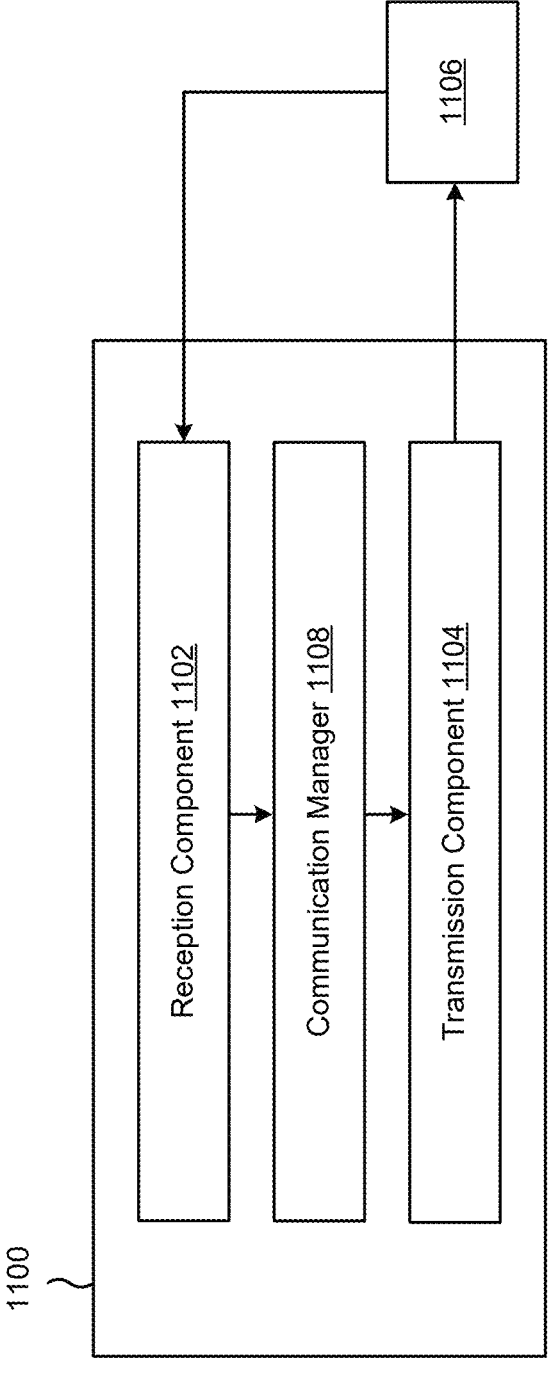

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 4 and 5. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, for transmission by a UE of an uplink communication, an indication of a first allocation of first resources on a first bandwidth and, for transmission by the UE of pilots for interference measurement associated with the uplink communication, an indication of a second allocation of second resources on a second bandwidth. The reception component 1102 may receive the uplink communication on the first resources on the first bandwidth, the second bandwidth being different from the first bandwidth.

The reception component 1102 may receive, from the UE, a request for the second allocation of the second resources.

The reception component 1102 may receive, from an additional UE, the request for the second allocation of the second resources.

The communication manager 1108 may identify the UE as a cause of the CLI for the additional UE based at least in part on parameters associated with the state.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, for transmission of an uplink communication, an indication of a first allocation of first resources on a first bandwidth and, for transmission of pilots for interference measurement associated with the uplink communication, an indication of a second allocation of second resources on a second bandwidth; and transmitting the uplink communication on the first resources on the first bandwidth and the pilots on the second resources on the second bandwidth, the second bandwidth being different from the first bandwidth.

Aspect 2: The method of Aspect 1, wherein the second bandwidth is greater than the first bandwidth, wherein the second bandwidth is adjacent to the first bandwidth, or wherein the second bandwidth includes a first portion and a second portion that is spaced from the first portion.

Aspect 3: The method of any of Aspects 1 or 2, further comprising: measuring the pilots on the second bandwidth; and receiving a downlink communication on the second bandwidth based at least in part on the pilots.

Aspect 4: The method of Aspect 3, wherein receiving the downlink communication on the second bandwidth based at least in part on the pilots comprises: estimating, based at least in part on the pilots, interference associated with transmitting the uplink communication; and correcting signals associated with the downlink communication based at least in part on the interference associated with transmitting the uplink communication.

Aspect 5: The method of any of Aspects 1-4, further comprising: transmitting a request for the second allocation of the second resources.

Aspect 6: The method of Aspect 5, wherein the request for the second allocation of the second resources comprises indications of one or more of: a requested width of the second allocation, or a requested periodicity of the second allocation.

Aspect 7: The method of any of Aspects 1-6, wherein the second allocation is based at least in part on: an allocation for reception of a downlink communication scheduled for full duplex communication with the uplink communication, or a measurement of a wideband channel that includes the first allocation and the second allocation.

Aspect 8: The method of Aspect 7, further comprising one or more of: transmitting an indication of the measurement of the wideband channel, transmitting an indication of a requested bandwidth to use for the downlink communication based at least in part on the measurement of the wideband channel, or transmitting an indication of a requested bandwidth not to use for the downlink communication based at least in part on the measurement of the wideband channel.

Aspect 9: A method of wireless communication performed by a base station, comprising: transmitting, for transmission by a user equipment (UE) of an uplink communication, an indication of a first allocation of first resources on a first bandwidth and, for transmission by the UE of pilots for interference measurement associated with the uplink communication, an indication of a second allocation of second resources on a second bandwidth; and receiving the uplink communication on the first resources on the first bandwidth, the second bandwidth being different from the first bandwidth.

Aspect 10: The method of Aspect 9, wherein the second bandwidth is greater than the first bandwidth.

Aspect 11: The method of any of Aspects 9 or 10, further comprising: receiving, from the UE, a request for the second allocation of the second resources, or receiving, from an additional UE, the request for the second allocation of the second resources.

Aspect 12: The method of Aspect 11, wherein the request for the second allocation of resources comprises indications of one or more of: a requested width of the second allocation, a requested periodicity of the second allocation, a requested transmission power associated with the second allocation, or an indication of a state in which a cross-link interference satisfies a threshold.

Aspect 13: The method of Aspect 12, further comprising: identifying the UE as a cause of the cross-link interference for the additional UE based at least in part on parameters associated with the state.

Aspect 14: The method of any of Aspects 9-13, wherein the second allocation is based at least in part on: an allocation for transmission, to the UE or an additional UE, of a downlink communication scheduled during a same time resource as the uplink communication, or a measurement of a wideband channel that includes the first allocation and the second allocation.

Aspect 15: The method of Aspect 14, further comprising one or more of: receiving an indication of measurements of one or more portions of the wideband channel; receiving an indication of a requested bandwidth to use for the downlink communication based at least in part on the measurement of the wideband channel; receiving an indication of a requested bandwidth not to use for the downlink communication based at least in part on the measurement of the wideband channel; receiving an indication of a requested bandwidth to use for the uplink communication based at least in part on the measurement of the wideband channel; or receiving an indication of a requested bandwidth not to use for the uplink communication based at least in part on the measurement of the wideband channel.

Aspect 16: The method of any of Aspects 9-15, wherein transmitting the indication of the second allocation is based at least in part on one or more of: a first channel estimation for a first downlink channel associated with the UE, or a second channel estimation for a second downlink channel associated with an additional UE.

Aspect 17: A method of wireless communication performed by a user equipment (UE), comprising: transmitting, to a base station, an indication of a state in which a cross-link interference satisfies a threshold; and receiving, from an additional UE, pilots for interference measurement on resources allocated for reception of a downlink communication from the base station.

Aspect 18: The method of Aspect 17, wherein a bandwidth of the pilots is greater than a bandwidth of an uplink communication by the additional UE.

Aspect 19: The method of any of Aspects 17 or 18, further comprising: measuring the pilots; and receiving the downlink communication based at least in part on the pilots.

Aspect 20: The method of Aspect 19, wherein receiving the downlink communication based at least in part on the pilots comprises: estimating, based at least in part on the pilots, interference associated with an uplink communication transmitted by the additional UE; and correcting signals associated with the downlink communication based at least in part on the interference associated with the uplink communication.

Aspect 21: The method of any of Aspects 17-20, further comprising: transmitting an indication of a measurement of one or more portions of a wideband channel; transmitting an indication of a requested bandwidth to use for the downlink communication based at least in part on the measurement of the wideband channel; transmitting an indication of a requested bandwidth not to use for the downlink communication based at least in part on the measurement of the wideband channel; transmitting an indication of a requested bandwidth for the additional UE to use for an uplink communication based at least in part on the measurement of the wideband channel; or transmitting an indication of a requested bandwidth for the additional UE not to use for the uplink communication based at least in part on the measurement of the wideband channel.

Aspect 22: The method of any of Aspects 17-21, further comprising transmitting indications of one or more of: a requested width of an allocation for the pilots, a requested periodicity of the allocation for the pilots, or a requested transmission power associated with the pilots.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
    one or more memories storing processor-executable code; and
    one or more processors coupled to the one or more memories, at least one processor of the one or more processors configured to cause the apparatus to:
        transmit an indication of a state in which a cross-link interference satisfies a threshold; and
        receive, from a second UE, pilots for interference measurement on a set of resources that overlap a first bandwidth allocated for reception of a downlink communication, wherein a second bandwidth of the pilots is greater than a third bandwidth of an uplink communication.

2. The apparatus of claim 1, wherein the at least one processor is further configured to cause the apparatus to:
    receive the downlink communication in accordance with the pilots.

3. The apparatus of claim 1, wherein the at least one processor is configured to cause the apparatus to:
    estimate, according to the pilots, interference associated with the uplink communication transmitted by the second UE; and
    correct signals associated with the downlink communication in accordance with the interference associated with the uplink communication.

4. The apparatus of claim 1, wherein the at least one processor is further configured to cause the apparatus to:

transmit an indication of a measurement of one or more portions of a wideband channel;

transmit an indication of a requested bandwidth for the second UE to use for the uplink communication in accordance with the measurement of the wideband channel; or transmit an indication of a requested bandwidth for the second UE not to use for the uplink communication in accordance with the measurement of the wideband channel.

5. The apparatus of claim 1, wherein the at least one processor is further configured to cause the apparatus to:

transmit indications of one or more of:

a requested width of an allocation for the pilots, a requested periodicity of the allocation for the pilots, or a requested transmission power associated with the pilots.

6. The apparatus of claim 1, wherein the at least one processor is further configured to cause the apparatus to:

identify a cause of the cross-link interference according to parameters corresponding to the state.

7. The apparatus of claim 1, wherein the at least one processor is further configured to cause the apparatus to:

transmit an indication of a requested bandwidth to use for the downlink communication in accordance with a measurement of a wideband channel; or transmit an indication of a requested bandwidth not to use for the downlink communication in accordance with the measurement of the wideband channel.

8. A method for wireless communication performed at a first user equipment (UE), comprising:

transmitting an indication of a state in which a cross-link interference satisfies a threshold; and receiving, from a second UE, pilots for interference measurement on a set of resources that overlap a first bandwidth allocated for reception of a downlink communication, wherein a second bandwidth of the pilots is greater than a third bandwidth of an uplink communication.

9. The method of claim 8, further comprising receiving the downlink communication in accordance with the pilots.

10. The method of claim 8, further comprising:

estimating, according to the pilots, interference associated with the uplink communication transmitted by the second UE; and correcting signals associated with the downlink communication in accordance with the interference associated with the uplink communication.

11. The method of claim 8, further comprising:

transmitting an indication of a measurement of one or more portions of a wideband channel;

transmitting an indication of a requested bandwidth for the second UE to use for the uplink communication in accordance with the measurement of the wideband channel; or transmitting an indication of a requested bandwidth for the second UE not to use for the uplink communication in accordance with the measurement of the wideband channel.

12. The method of claim 8, further comprising:

transmitting indications of one or more of:

a requested width of an allocation for the pilots, a requested periodicity of the allocation for the pilots, or a requested transmission power associated with the pilots.

13. The method of claim 8, further comprising identifying a cause of the cross-link interference according to parameters corresponding to the state.

14. The method of claim 8, further comprising:

transmitting an indication of a requested bandwidth to use for the downlink communication in accordance with a measurement of a wideband channel; or transmitting an indication of a requested bandwidth not to use for the downlink communication in accordance with the measurement of the wideband channel.

15. A non-transitory computer-readable medium storing a set of instructions for wireless communication, the set of instructions comprising:

one or more instructions that, when executed at a first user equipment (UE), cause the first UE to:

transmit an indication of a state in which a cross-link interference satisfies a threshold; and receive, from a second UE, pilots for interference measurement on a set of resources that overlap a first bandwidth allocated for reception of a downlink communication, wherein a second bandwidth of the pilots is greater than a third bandwidth of an uplink communication.

\* \* \* \* \*